United States Patent
Fischer et al.

[11] Patent Number: 5,757,085
[45] Date of Patent: May 26, 1998

[54] MAINTENANCE-FRIENDLY IMMOBILIZATION SYSTEM

[75] Inventors: Werner Fischer, Heimshein; Martin Laichinger, Ebersbach, both of Germany

[73] Assignee: Robert Bosch GmbH, Stuttgart, Germany

[21] Appl. No.: 663,059

[22] PCT Filed: Aug. 28, 1995

[86] PCT No.: PCT/DE95/01343

§ 371 Date: Jun. 18, 1996

§ 102(e) Date: Jun. 18, 1996

[87] PCT Pub. No.: WO96/12631

PCT Pub. Date: May 2, 1996

[30] Foreign Application Priority Data

Oct. 19, 1994 [DE] Germany ............... 44 37 334.1

[51] Int. Cl.$^6$ ............................................ B60R 25/04
[52] U.S. Cl. ................................. 307/10.5; 180/287
[58] Field of Search .................... 307/9.1–10.6, 307/141, 141.4, 141.8; 123/146.5 A, 186.1; 180/287; 70/237, 252, 258, 264, 268–274; 340/425.5, 426, 430, 825.3–825.32, 825.34, 825.44, 825.54, 825.69, 825.72; 364/423.098, 424.034, 424.037, 424.045, 424.055; 361/199–202

[56] References Cited

U.S. PATENT DOCUMENTS

| Re. 32,474 | 8/1987 | Reid | 307/10.1 |
|---|---|---|---|
| 3,656,100 | 4/1972 | Beltrami | 307/10.3 |
| 4,240,516 | 12/1980 | Henderson et al. | 307/10.2 |
| 4,733,100 | 3/1988 | Nusairat et al. | 307/9.1 |
| 4,733,101 | 3/1988 | Graham et al. | 307/10.1 |
| 5,079,435 | 1/1992 | Tanaka | 307/10.2 |
| 5,519,260 | 5/1996 | Washington | 307/10.5 |

FOREIGN PATENT DOCUMENTS

| 3935144-C2 | 4/1990 | Germany. |
|---|---|---|
| 4317117-C1 | 7/1994 | Germany. |
| 0372 741 A2 | 6/1990 | United Kingdom. |

*Primary Examiner*—Richard T. Elms
*Attorney, Agent, or Firm*—Spencer & Frank

[57] ABSTRACT

A motor vehicle immobilization system having an anti-theft control device (13) and a function control device (10, 11) which is released by a regular unlocking communication with the anti-theft control device (13). To permit simple maintenance of individual engine function units, the function control device (10, 11) has bypass means (204 through 220) which permit an atypical unlocking of the function control device (10, 11) by the external device (19). The bypass means (204 through 220) include a time-delay device (206, 218) which, during atypical unlocking, only releases the function control device (10, 11) after the passage of a predetermined delay time ($T_F$).

6 Claims, 3 Drawing Sheets

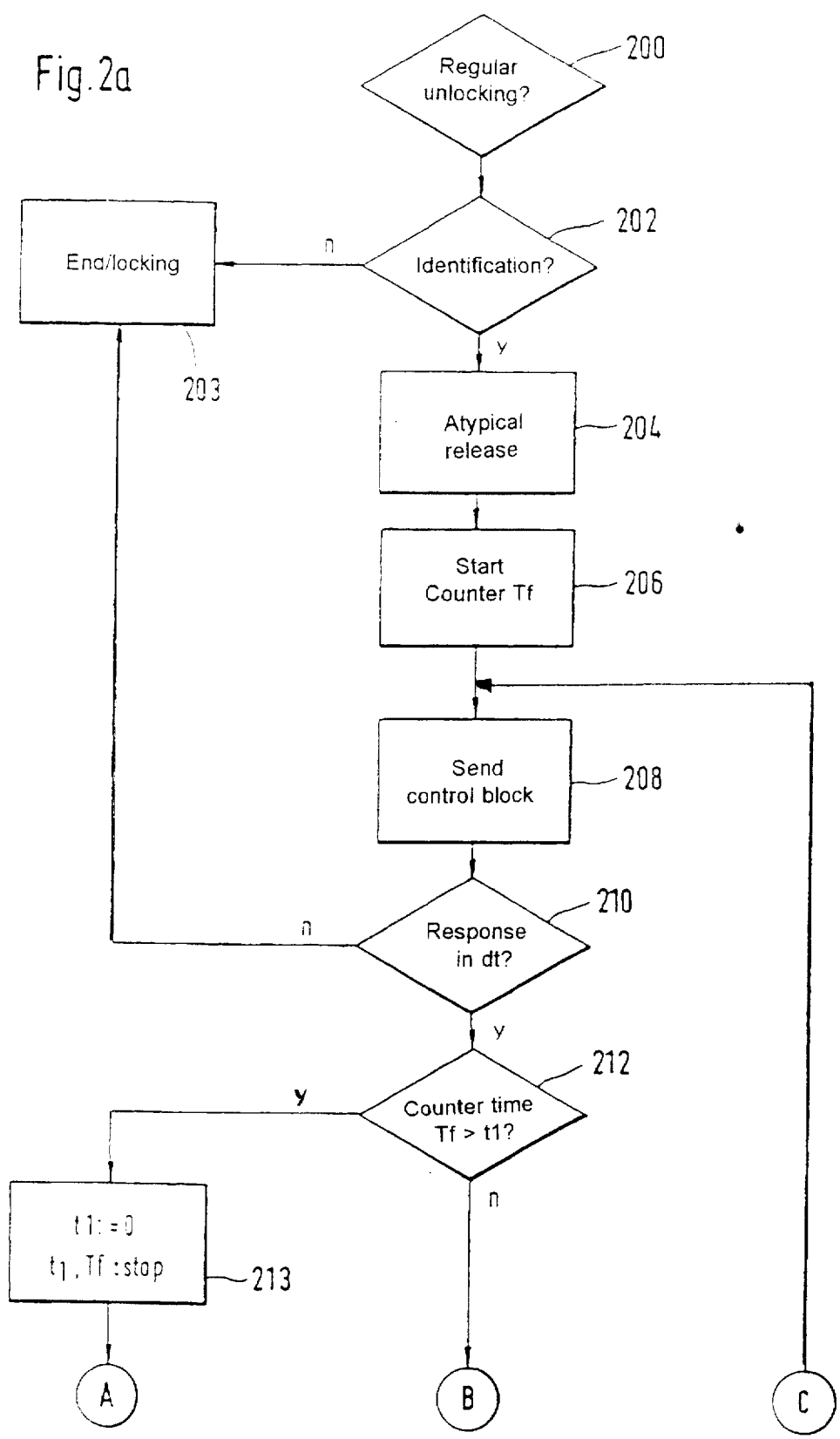

MAINTENANCE-FRIENDLY IMMOBILIZATION SYSTEM

STATE OF THE ART

The invention relates to a vehicle immobilization system for a motor vehicle, having an anti-theft control device for performing a user-legitimization check and having at least one function control device for controlling the operation of an engine component, with the function control device being connected to the anti-theft control device by a line or conductor system. Devices of this type are being used more and more frequently to combat the increasing incidence of auto theft. Their mode of operation is based on only enabling the function of control devices necessary for vehicle operation, for instance a device for operating the diesel shut-off valve or motor control device, if a code entered by the user matches a code stored in advance in the control device. A special operating situation arises if the control device controlling the motor function unit is intended to be operated separately from the vehicle. This is typically the case during engine maintenance, for example when the diesel pump and consequently the device that controls the diesel shut-off valve are to be tested on a testing bench. The function unit must then be able to be enabled externally, that is, without involvement of the legitimization testing device present in the vehicle for this purpose. This can be-effected in a simple manner by manually supplying the code, with suitable input means, which would otherwise be supplied by an anti-theft control device. In this instance, the correct code must be known to the person performing the test. This is, however, a disadvantage both with respect to maintenance friendliness and with respect to the security effect. Namely, the owner of the vehicle must know the code. Frequently, however, the code is transferred to the vehicle without owner involvement, for example in the form of transponder triggering. Usually the owner does not know the correct code. It must therefore typically be registered externally, for example, on a card. However, in this case the danger of the user misplacing the card automatically increases. On the other hand, the option of enabling a function unit by externally supplying the correct code, bypassing the anti-theft control device, facilitates startup of the vehicle by an unauthorized user. Essentially, only external unlocking means are required for manual enabling, such as those also used for authorized maintenance in a workshop. If a thief having this type of equipment additionally obtains the code, he can put a vehicle into operation without difficulty.

The object of the present invention, therefore, is to configure an anti-theft device for motor vehicles such that it permits simple maintenance of the motor function unit incorporated into the protection device without limiting the security effect.

SUMMARY OF THE INVENTION

The above object generally is accomplished according to the present invention by a vehicle immobilization system for a motor vehicle, having an anti-theft control device for performing a user-legitimization check and having at least one function control device for controlling the operation of an engine component, with the function control device being connected to the anti-theft control device by a conductor or line system, and wherein the function control device includes a circuit which processes digital signals and only permits startup of the function control device after a regular unlocking communication with the anti-theft control device has taken place, and further includes bypass means which permit an atypical unlocking of the function control device in response to a communication from a device which is external to the vehicle if the regular unlocking communication is omitted, which external device acts directly on the function control device, bypassing the anti-theft control device. The unlocking of a protected engine component is only possible by means of a special, atypical unlocking procedure. In particular, this procedure encompasses steps that require the passage of down time. Consequently, it is not possible for unauthorized uses to start a vehicle in a short time without legitimization, even if they have access to the necessary release means. The time-intensive release procedure does not disturb maintenance jobs. It can be performed automatically for the most part, so that the necessary down time can be used for other purposes.

It is very useful to equip the protected engine components with a time-delay that only allows the associated engine components to be put into operation after the passage of a predetermined delay time at the beginning of the atypical unlocking procedure.

The device according to the invention can be manufactured cost-effectively. It is advisably embodied as a software solution in the form of a program inside a logical circuit which is provided anyway for a protected engine component. Therefore, existing arrangements can easily be retrofitted with the device.

An advantageous increase in anti-theft security ensues in that the supply of a predetermined signal by way of the release means is periodically requested during the delay time. The user involved with the release is thereby required to repeatedly turn to the engine component to be enabled. An unauthorized, secretive starting of the vehicle is therefore practically no longer possible.

The external startup device advisably has suitable input means for input of the required predetermined signals. For example, these means can comprise a keyboard. It is also possible, however, to enter the required predetermined signals by way of a switch present on the engine component, for example, the gas pedal.

Moreover, it is advantageous to release the vehicle for a predetermined, small number of startups after the atypical startup procedure has been performed. The number is particularly based on the average requirements within the scope of maintenance.

An embodiment of the proposed security device is described in detail below with reference to the drawing.

BRIEF DESCRIPTION OF THE DRAWING

FIGS. 2a and 2b are a flow chart of the course of an atypical unlocking procedure.

DESCRIPTION OF THE EMBODIMENTS

Figure 1:
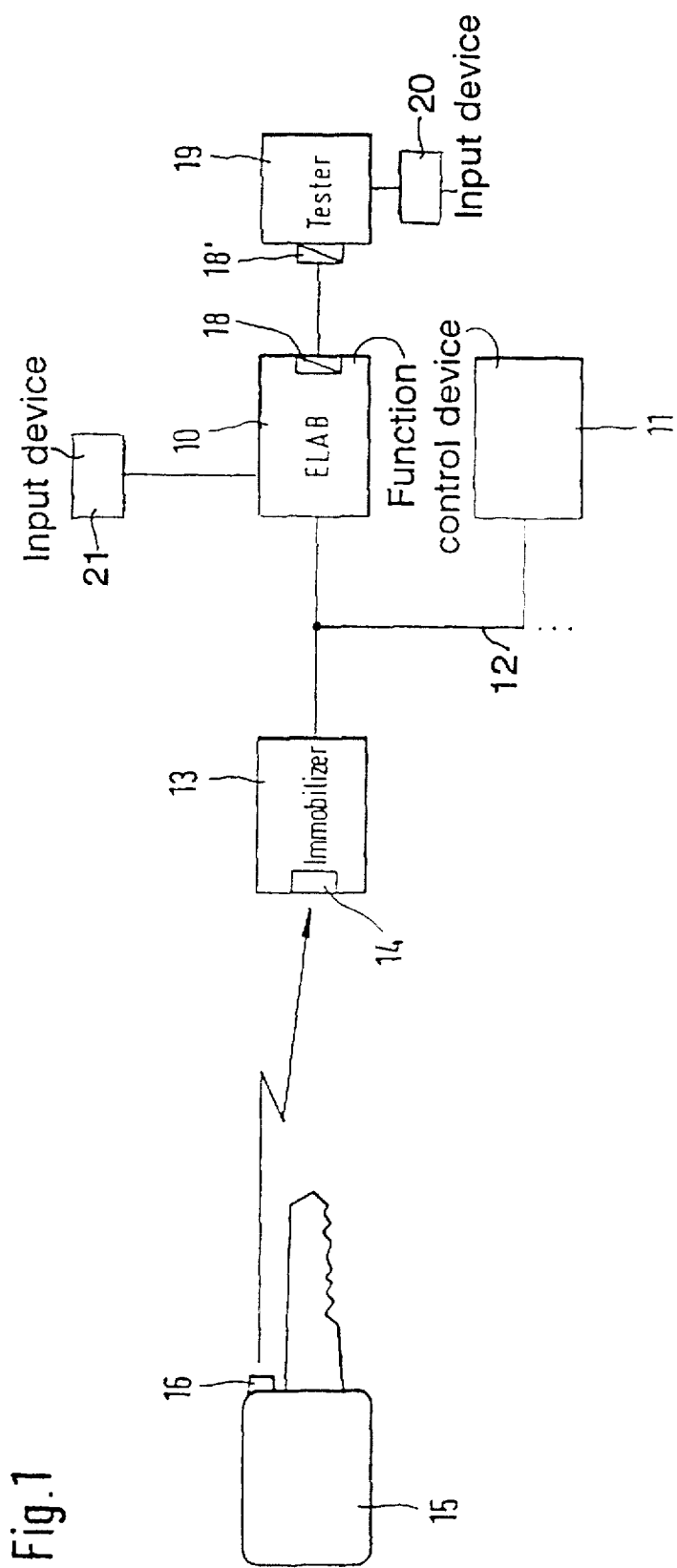
FIG. 1 shows a block diagram of a vehicle immobilization system according to the invention.

FIG. 1 shows a typical design of an anti-theft device, hereinafter referred to as vehicle immobilization system, as it forms the basis of the present invention. The crux of the illustrated arrangement is an anti-theft control device 13, hereinafter referred to as immobilizer. One or a plurality of function control devices 10, 11 is or are connected to the immobilizer 13 by way of a line system 12. In the example, this is a device 10 for operating the shut-off valve at the diesel pump. All of the function control devices 10, 11 respectively make use of their own microprocessor or a similar circuit that processes digital signals. In connection with a control program, the circuit verifies the control functions performed by the function control device. Furthermore, the immobilizer 13 uses a receiving device 14 for supplying a vehicle/user-specific code for a legitimization check. As shown in FIG. 1, this code can be supplied by a transmitting device 16 which can in turn be disposed in the vehicle key, for example. This supply is frequently effected without contact, for example by an infrared or high-frequency signal. It can, however, also be effected by way of a keyboard connected to the immobilizer 13 by way of a line. A plurality of further variations known in the technical field also exists for implementing the supply of the code to the immobilizer 13.

The arrangement illustrated in FIG. 1 operates as follows. To start the vehicle, first the user transmits the user/vehicle-specific code to the immobilizer 13. The immobilizer 13 compares the received code to a code stored in a memory. If the received code and the reference code match, the immobilizer 13 unlocks the function control devices 10, 11. To this end it effects a regular unlocking communication with the function control devices 10, 11. This communication advisably includes a further comparison of the codes, with a code generated by the immobilizer being compared to a code present in the function control device 10, 11. The unlocking communication ensures that the used immobilizer 13 is regularly a part of the function control devices 10, 11. If the check of the user code or the unlocking communication takes place in a predetermined manner, and in articular if the checked codes respectively match the present reference codes, vehicle operation is enabled. Otherwise, the function control devices 10, 11 remain blocked, so that vehicle operation is not possible.

In accordance with the invention, enabling of a function control device 10, 11 is also possible if the device was separated from the immobilizer 13 or line system 12. This is the case, for example, if a function control device 10, 11 is to be tested in the removed state by means of an external device 19. External device 19 is typically a diagnostic device, as indicated in FIG. 1. It can be connected to the function control devices 10, 11 by way of an interface 18, 18'. For enabling, in this case the function control devices 10, 11 also make use of bypass means which permit enabling of the function control devices 10, 11 in connection with an atypical unlocking procedure. These means are advisably embodied in the form of a program within the control programs of the function control devices 10, 11.

Figure 2B:
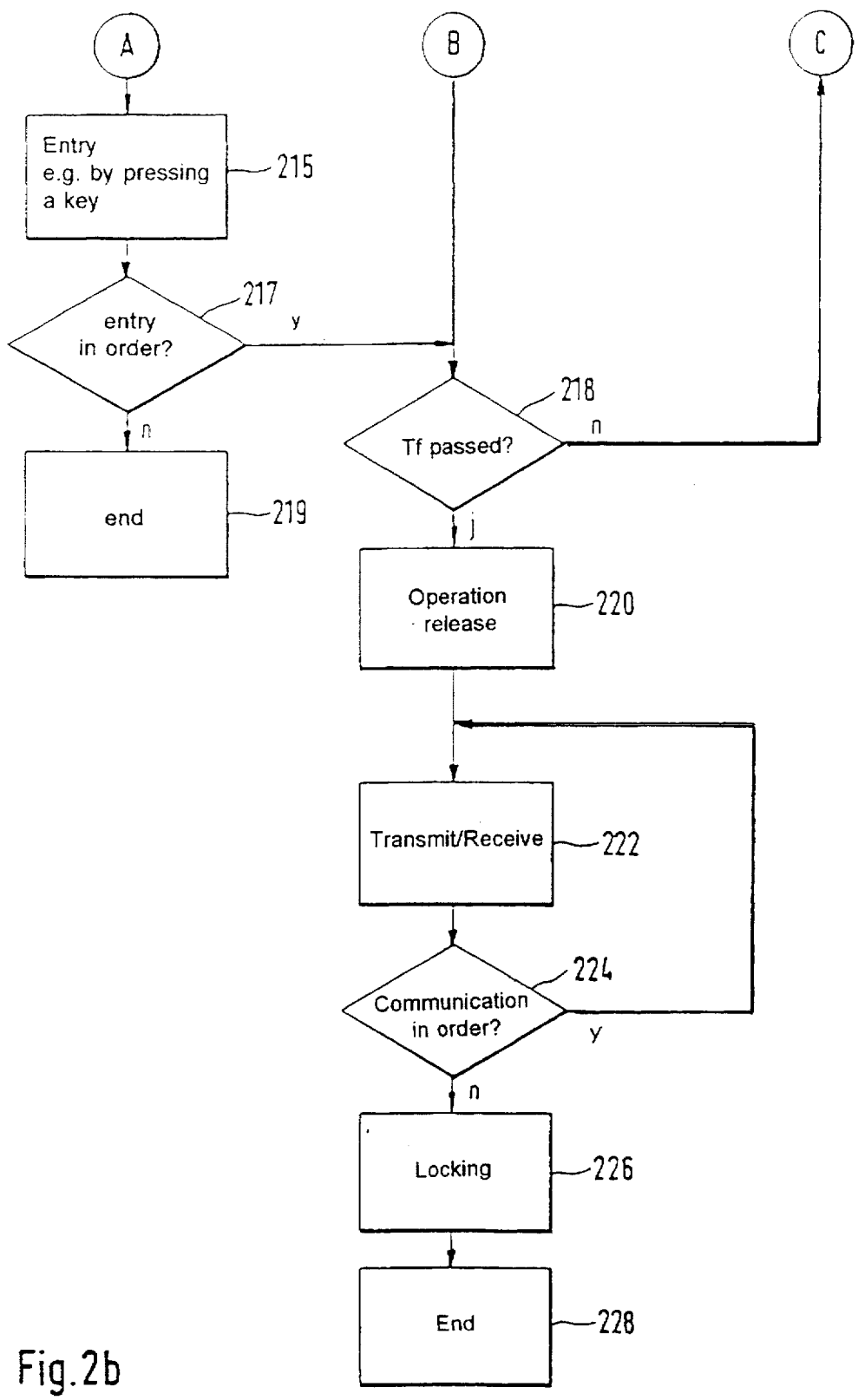

FIG. 2 shows the course of an atypical unlocking procedure. It starts when the function control device 10, 11 checks whether a regular unlocking procedure is performed, step 200. This check is a component of the regular unlocking procedure, and is effected with each unlocking. If the result of the check is positive, the one regular unlocking procedure is performed. The above-described unlocking communication follows. If the result of the check in step 200 is negative, the function control device 10, 11 checks in step 202 whether the unlocking should be performed in an atypical manner by an external device 19 which is not normally a part of the vehicle, and whose identification is stored in a memory in the function control device 10, 11. An example, of this type of device is a diagnostic device 19. If an attempt is made to perform the unlocking with a device that is unknown to the function control unit, the identification of which device is not stored in the memory, the unlocking procedure is halted and the function control device 10, 11 remains locked, step 203. It is not possible to start the vehicle.

If, in contrast, the external device 19 used for unlocking possesses an identification that is known to the function control device 10, 11, the atypical release procedure is initiated in step 204. In step 206 a first counter is started which detects the passage of a release time $T_F$. It determines the amount of time by which the actual operation release of the function control device 10, 11 is delayed with respect to the beginning of the atypical release procedure. Its value lies in a range of a few minutes, for example 15 to 50 minutes.

In step 208 the function control device 10, 11 transmits a block of control data to the external device 19 used in unlocking. It serves on the one hand to verify the connection line between external device 19 and function control device 10, 11, and on the other hand to ensure that the external device 19 is authorized for the atypical unlocking. In step 210 the function control device 10, 11 verifies whether the external device 19 has responded in a predetermined way within a predetermined time dt. If the result of this check is negative, the atypical unlocking is halted, step 203, and the function control device is locked.

If the result of the check in step 210 is positive, a check is made in step 212 to determine whether the counter time Tr is greater than a predetermined time window $t_1$. The time window determines at which times a user is requested to make an entry within the framework of an atypical unlocking procedure. It is dimensioned, for example, according to the relationship $t_1/T_F=3$, so that three additional entries are necessary within the release time $T_F$. If the time window t1 has not passed, in step 218 the function control device checks whether the release time $T_F$ has passed. If this is likewise not the case, steps 208 through 218 are repeated.

If the check in step 212 reveals that the time window t1 has passed, it is first reset to the value 0 in step 213. The course of the time window $T_F$ is then interrupted. The function control device 10, 11 now waits for the external device 19 to make an entry. The entry can be made, for example, by pressing a key or entering a code, e.g. by means of an input device 20 such as a keyboard. Alternatively, the requested entry may be provided by an input device 21 already provided on the engine component being controlled, for example, the gas pedal or a switch. In step 217 a check is made to determine whether the entry has been made. If this is the case, the time window $T_F$ is restarted, step 219; step 218 is subsequently performed.

If the check in step 217 reveals that no entry was made, or that the entry does not possess a predetermined form, the atypical release procedure is again halted, step 219; the function control device 10, 11 remains locked.

If the query in step 218 reveals that the release time TF has passed, the function control device 10, 11 is released. Following the release of the function control device 10, 11, a test communication with the external device 19 further takes place cyclically. Analogously to step 208, in step 222 a control block is sent to the device 19. Subsequently, in step 224 a check is made to determine whether a predetermined response has been given within a predetermined time dt and the communication is therefore in order. In step 225 a check is made to determine whether a signal indicating the end of operation is present. If this is the case, or the check in step 224 reveals a communication error, the function control device 10, 11 halts its operation and locks. If a signal for the end of operation is not present, and the communication is in order, steps 222 through 225 are repeated. A plurality of modifications are possible which retain the concept underlying the device of the invention. The sequence of the process steps illustrated in the flow chart according to FIGS. 2a and 2b can therefore be interchanged, or the steps can even be omitted completely. The latter applies, for example, to the additional entry required by steps 211 through 217. Process steps 208 and 210 or 222 and 224 for checking the line connection between external device 19 and function control device 10, 11 can be omitted or embodied in a completely different manner.

The release can be effected for a one-time startup, but also for a predetermined, small number of releases. The latter solution is most useful if a function control device 10, 11 must regularly be started several times during maintenance.

We claim:

1. In a vehicle immobilization system for a motor vehicle, having an anti-theft control device for performing a user-legitimization check and having at least one function control device for controlling the operation of an engine component, the function control device being connected to the anti-theft control device by a line system, the improvement wherein the function control device includes a circuit which processes digital signals and only permits startup of the function control device after a regular unlocking communication with the antitheft control device has taken place, and further includes bypass means (204 through 220) which permit an atypical unlocking of the function control device by a device which is external to the vehicle if the regular unlocking communication is omitted, which external device acts directly on the function control device, bypassing the anti-theft control device.

2. Vehicle immobilization system according to claim 1, wherein the bypass means, in an atypical unlocking, first releases the function control device after the passage of a predetermined delay time (TF) at the beginning of the atypical unlocking.

3. Vehicle immobilization system according to claim 2 wherein, during the delay time $(T_F)$, the bypass means periodically request the external device that a predetermined signal be supplied.

4. Vehicle immobilization system according to claim 3, wherein the external device has input means with.which the predetermined signal is to be entered and supplied.

5. Vehicle immobilization system according to claim 3, wherein the predetermined signal is supplied by input means already present in the control device.

6. Vehicle immobilization system according to claim 1, wherein the function control device is unlocked for a predetermined number of unlocking procedures during atypical unlocking.

* * * * *